W. B. STEVENS.
OPERATING LEVER.
APPLICATION FILED FEB. 12, 1912.
1,135,737.
Patented Apr. 13, 1915.
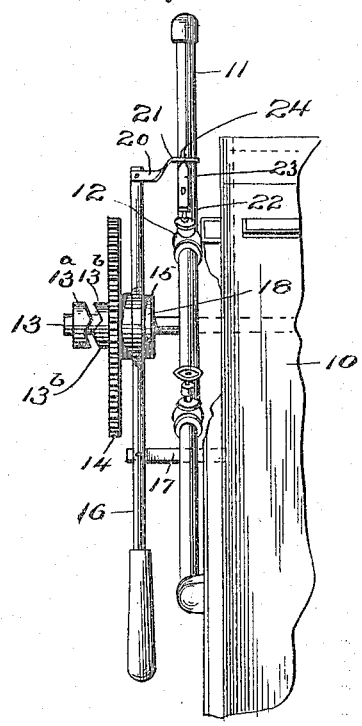
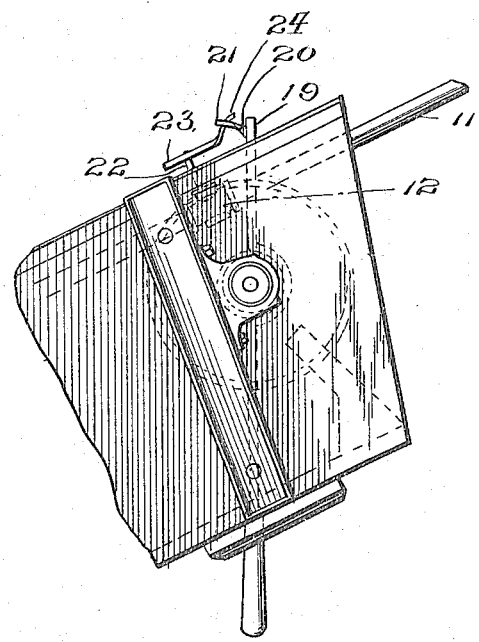
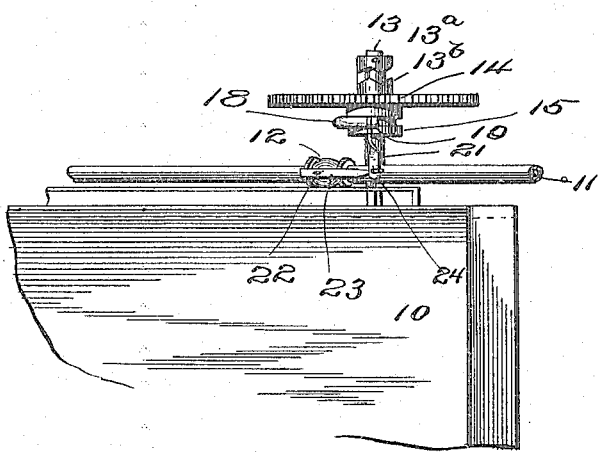

UNITED STATES PATENT OFFICE.

WILLIAM B. STEVENS, OF TRAPPE, MARYLAND.

OPERATING-LEVER.

1,135,737.

Specification of Letters Patent.

Patented Apr. 13, 1915.

Application filed February 12, 1912. Serial No. 677,165.

*To all whom it may concern:*

Be it known that I, WILLIAM B. STEVENS, a citizen of the United States, residing at Trappe, in the county of Talbot and State of Maryland, have invented certain new and useful Improvements in Operating-Levers, of which the following is a specification.

This invention relates to new and useful improvements in operating levers, designed particularly for use in connection with vegetable, or fruit scalding machines and apparatus.

Heretofore, in the construction of scalding machines and particularly tomato scalder, the tomatoes are carried through a receptacle or tank by an endless conveyer and are subjected to a spray of scalding steam while being carried through. In a machine constructed in this manner the conveyer and flow of steam are stopped by separate operations. Thus, if the conveyer is stopped first, a portion of the tomatoes are subjected to a spray of scalding steam for longer than the required time and they become mutilated; and likewise, if the flow of the steam is stopped, primarily, a number of tomatoes pass through the machine without being acted upon by the steam. The present invention is designed to eliminate these objectionable features, by providing a mechanism whereby the power and the steam may be shut off simultaneously.

With the above and other objects in view, this invention consists in the construction, combination and arrangement of parts all as hereinafter more fully described, claimed, and illustrated in the accompanying drawings, wherein:—

Figure 1 is a fragmentary front elevation of a tomato scalding machine illustrating the present invention applied thereto, Fig. 2 is a side elevation thereof, Fig. 3 is a top plan view.

The present invention may be applied to any scalding machine or similar mechanism, provided with a steam supply pipe, a valve located in said supply pipe, a power transmission shaft, with clutch operable thereon and clutch operating lever. The clutch operating lever extends considerably above horizontal plane of the power transmission shaft, and is provided at the upper terminal of this extension with an off-set rod or bar which is operated to start and stop the clutch. The valve of the steam supply pipe is provided with an off-set handle which is pivotally connected to the rod or bar aforesaid, carried by the clutch lever, said connection being such that a movement upon the part of the clutch lever will operate the valve regulating the supply of steam.

Reference being had more particularly to the drawings, 10 indicates a scalding machine of any desired construction, provided with the steam supply pipe 11. The flow of steam through the pipe 11 is regulated by the valve 12, which controls the entire supply of steam for the machine 10. A power transmission 13 is arranged to operate the conveyers of the machine 10, said shaft being provided with the stationary and slidable clutch members 13ᵃ and 13ᵇ respectively. The slidable clutch member 13ᵇ is provided with a gear or pulley 14, by means of which power is transmitted to the slidable member 13ᵇ, and also with a grooved extension 15 through the instrumentality of which the operating lever 16 engages the same. A bracket 17 is mounted upon the frame work of the machine and has, pivotally connected thereto, the operating lever 16, which is provided with an intermediate curved portion 18 for engagement with extension 15 of the stationary clutch member 13ᵇ.

The operating lever 16 is provided with an extension 19 above the curved portion 18, which has an arm 20 rigidly secured to the terminal thereof. This arm 20 extends normally to a position over the valve 12 and its free portion off-set upwardly as at 21.

The stem 22 of the valve 12 extends upwardly a greater distance than usual in valves of this nature, and has a handle 23 rigidly secured to the upper end thereof, said handle normally resting in a plane parallel to the pipe 11. This handle 23 is off-set upwardly at its free terminal as at 24 and is pivotally connected to the off-set portion of the arm 20.

From the foregoing, it will clearly be seen that as the lever 16 is oscillated to move the clutch members 13ᵃ and 13ᵇ, into and out of engagement, the handle 23 is oscillated, turning the stem 22 to close or open the valve 12 in accordance with the position of the clutch members aforesaid.

Having thus fully described my invention, what I claim as new and desire to secure by U. S. Letters Patent is:—

The hereindescribed compound operating lever consisting of an elongated bar having a curved offset portion, a sliding clutch member engaged by said offset portion, a handle on one end of said lever, and said lever being pivoted between the handle and said offset portion, an angular arm connected to the end of said lever opposite the handle, said arm having an offset and apertured portion, and a valve stem to which said offset and apertured portion is pivoted, whereby said clutch and valve are operated simultaneously by the movement of said lever.

In testimony whereof I affix my signature in presence of two witnesses.

WILLIAM B. STEVENS.

Witnesses:
 CHAS. J. BUTLER,
 J. FLETCHER CLARK.

Copies of this patent may be obtained for five cents each, by addressing the "Commissioner of Patents, Washington, D. C."